(12) United States Patent
Lisbona (10) Patent No.: US 7,850,390 B2
(45) Date of Patent: Dec. 14, 2010

(54) FRAME WITH SELF-LOCKING JOINT (75) Inventor: Randall L. Lisbona, Coppell, TX (US)

(73) Assignee: Lennox Industries Inc., Richardson, TX (US)

( * ) Notice: Subject to any disclaimer, the term of this patent is extended or adjusted under 35 U.S.C. 154(b) by 584 days.

(21) Appl. No.: 11/367,827

(22) Filed: Mar. 3, 2006

(65) Prior Publication Data
US 2007/0204575 A1 Sep. 6, 2007

(51) Int. Cl.
F16B 7/00 (2006.01)
B65D 90/02 (2006.01)

(52) U.S. Cl. .................... 403/382; 403/231; 312/265.4; 220/668

(58) Field of Classification Search ................. 211/186, 211/27, 72, 182, 119.004, 132.1, 195, 189, 211/26, 126.11, 126.12; 312/265.1–265.4, 312/223.1, 223.2, 407; 220/615, 621, 682, 220/691, 690; 206/449, 451, 454, 517; 403/205, 403/382, 403, 375, 231, 187, 253, 329, 397; 52/660, 280, 242, 656.1, 656.9, 241, 79.1, 52/220.7; 29/521, 524, 897.3, 897.31, 897.312, 29/453; 40/780, 782, 781, 611.03, 611.04; 55/495, 497, 481, 506, DIG. 31

See application file for complete search history.

(56) References Cited

U.S. PATENT DOCUMENTS

| | | | | | |
|---|---|---|---|---|---|
| 1,256,993 | A * | 2/1918 | Eidlitz | ......................... | 40/782 |
| 1,905,023 | A * | 4/1933 | White | ........................... | 249/9 |
| 1,946,694 | A * | 2/1934 | Hunter | ....................... | 138/157 |
| 2,083,354 | A * | 6/1937 | Whittier | ..................... | 403/382 |
| 2,247,024 | A * | 6/1941 | Hurley | ........................ | 52/632 |
| 2,262,730 | A * | 11/1941 | Way | ............................ | 206/451 |
| 2,275,109 | A * | 3/1942 | McGee | ...................... | 52/481.1 |
| 2,304,126 | A * | 12/1942 | Skeel | ......................... | 403/205 |
| 2,405,293 | A * | 8/1946 | Verner | ......................... | 55/529 |
| 2,405,716 | A * | 8/1946 | Schaaf | ........................ | 55/489 |
| 2,489,851 | A * | 11/1949 | Bean | ............................. | 249/9 |
| 2,611,460 | A * | 9/1952 | Nash | ......................... | 403/382 |
| 2,723,731 | A * | 11/1955 | Schaaf | ........................ | 52/658 |
| 2,784,781 | A * | 3/1957 | Rhoades | ..................... | 160/371 |
| 2,869,694 | A * | 1/1959 | Breckheimer | ................ | 52/658 |
| 2,973,831 | A * | 3/1961 | Sprouse et al. | ................ | 55/491 |
| 3,074,459 | A * | 1/1963 | Pavia | .......................... | 72/129 |
| 3,194,361 | A * | 7/1965 | Thurman | ..................... | 52/764 |
| 3,484,068 | A * | 12/1969 | Yoder | .......................... | 248/158 |
| 3,491,501 | A * | 1/1970 | Lundgren | .................. | 52/656.9 |
| 3,606,027 | A * | 9/1971 | Clements | .................... | 211/191 |
| 3,680,271 | A * | 8/1972 | Satchell | ....................... | 52/656.1 |
| 3,719,986 | A * | 3/1973 | Ardolino et al. | ............. | 29/509 |

(Continued)

FOREIGN PATENT DOCUMENTS

JP 55120436 A * 9/1980

Primary Examiner—Michael Safavi (57) ABSTRACT

A frame is comprised of plural frame members, each of which has plural projections and plural recesses in opposed relationship to the respective projections of the corresponding frame member. The frame is assembled by snapping selected ones of the frame members together so that the projections of a selected one or more of the frame members are urged into nesting engagement with the recesses of a selected other one or more of the frame members. Selected ones of the frame members are equipped with locking tabs to maintain the frame members in their assembled configuration and to counteract a force tending to disengage the projections from the respective recesses.

15 Claims, 10 Drawing Sheets

U.S. PATENT DOCUMENTS

| | | | |
|---|---|---|---|
| 3,845,601 A * | 11/1974 | Kostecky | 52/290 |
| 4,479,737 A * | 10/1984 | Bergh et al. | 403/382 |
| 4,656,801 A * | 4/1987 | Erlam | 52/280 |
| 4,760,682 A * | 8/1988 | King | 52/844 |
| 4,809,476 A * | 3/1989 | Satchell | 52/241 |
| 4,835,935 A * | 6/1989 | Murphy | 52/281 |
| 4,918,899 A * | 4/1990 | Karytinos | 52/690 |
| 4,996,929 A * | 3/1991 | Saal | 108/107 |
| 5,081,813 A * | 1/1992 | White | 52/656.1 |
| 5,394,665 A * | 3/1995 | Johnson | 52/241 |
| 5,735,411 A * | 4/1998 | Flamme et al. | 211/26 |
| 5,797,233 A * | 8/1998 | Hascall | 52/481.1 |
| 5,839,848 A * | 11/1998 | Sahramaa | 403/382 |
| 6,076,328 A * | 6/2000 | Danhof et al. | 52/762 |
| 6,176,053 B1 * | 1/2001 | St. Germain | 52/232 |
| 6,310,769 B1 * | 10/2001 | Johnson et al. | 361/683 |
| 6,337,793 B1 * | 1/2002 | Vier et al. | 361/683 |
| 6,374,558 B1 * | 4/2002 | Surowiecki | 52/241 |
| 6,377,446 B1 * | 4/2002 | Liau | 361/683 |
| 6,568,138 B1 * | 5/2003 | Frost et al. | 52/241 |
| 6,592,643 B2 * | 7/2003 | Shah et al. | 55/497 |
| 6,647,691 B2 * | 11/2003 | Becker et al. | 52/656.1 |
| 6,983,569 B1 * | 1/2006 | Rosenberg | 52/241 |
| 7,295,447 B2 * | 11/2007 | Strmiska et al. | 361/798 |
| 2003/0002915 A1 * | 1/2003 | Chen | 403/231 |
| 2003/0029100 A1 * | 2/2003 | Wetzel, III et al. | 52/79.1 |
| 2003/0093969 A1 * | 5/2003 | Saldana | 52/715 |
| 2004/0074198 A1 * | 4/2004 | Saldana | 52/712 |
| 2007/0175836 A1 * | 8/2007 | Bumeder et al. | 211/26 |

* cited by examiner

FRAME WITH SELF-LOCKING JOINT

TECHNICAL FIELD

This invention relates generally to frames used to house selected components and in particular to a frame with one or more self-locking corner joints.

BACKGROUND ART

Relatively rigid frames used to house various kinds of components are known in the art. For example, rectangular-shaped, three-dimensional frames are often used to house an air filter media in a central heating, ventilating and air conditioning (HVAC) system in a residence or other building. It is advantageous to ship such filter frames in pieces (i.e., in a "knockdown" configuration) so that they can assembled on site by an installer. However, assembly of such frames on site may require as many as 16 fasteners (four in each corner), which adds to the expense and time of assembly.

SUMMARY OF THE INVENTION

In accordance with the present invention, a frame is provided, which is comprised of at least first and second interconnected frame members. The first frame member has a first projection on one side thereof and a first recess in opposed relationship to the first projection. The second frame member has a second projection on one side thereof and a second recess in opposed relationship to the second projection. The second frame member is positioned with respect to the first frame member so that the second projection is in nesting engagement with the first recess, whereby the second frame member is connected to the first frame member to define at least a portion of the frame.

In accordance with one embodiment of the invention, the second frame member has a tab adapted to engage the first frame member to inhibit disengagement of the second projection from the first recess.

In accordance with another embodiment of the invention, the first projection is defined by an inwardly displaced portion of the first frame member and the second projection is defined by an inwardly displaced portion of the second frame member. The inwardly displaced portions further define the respective first and second recesses on respective outer surfaces of the first and second frame members.

In accordance with yet another embodiment of the invention, each of the first and second projections defines a hump on an inner surface of the corresponding frame member. A portion of each hump is separated from the inner surface of the corresponding frame member to define an aperture therebetween.

In accordance with still another embodiment of the invention, the frame further includes a removable rail member with a notch therein. The rail member is positioned with the notch aligned with a complementary portion of one of the first and second frame members, so that the rail member is retained in a predetermined position with respect to the frame.

BEST MODE FOR CARRYING OUT THE INVENTION

The best mode for carrying out the invention will now be described with reference to the accompanying drawings. Like parts are marked in the specification and drawings with the same respective reference numbers. In some instances, proportions may have been exaggerated in order to depict certain features of the invention.

Figure 1:
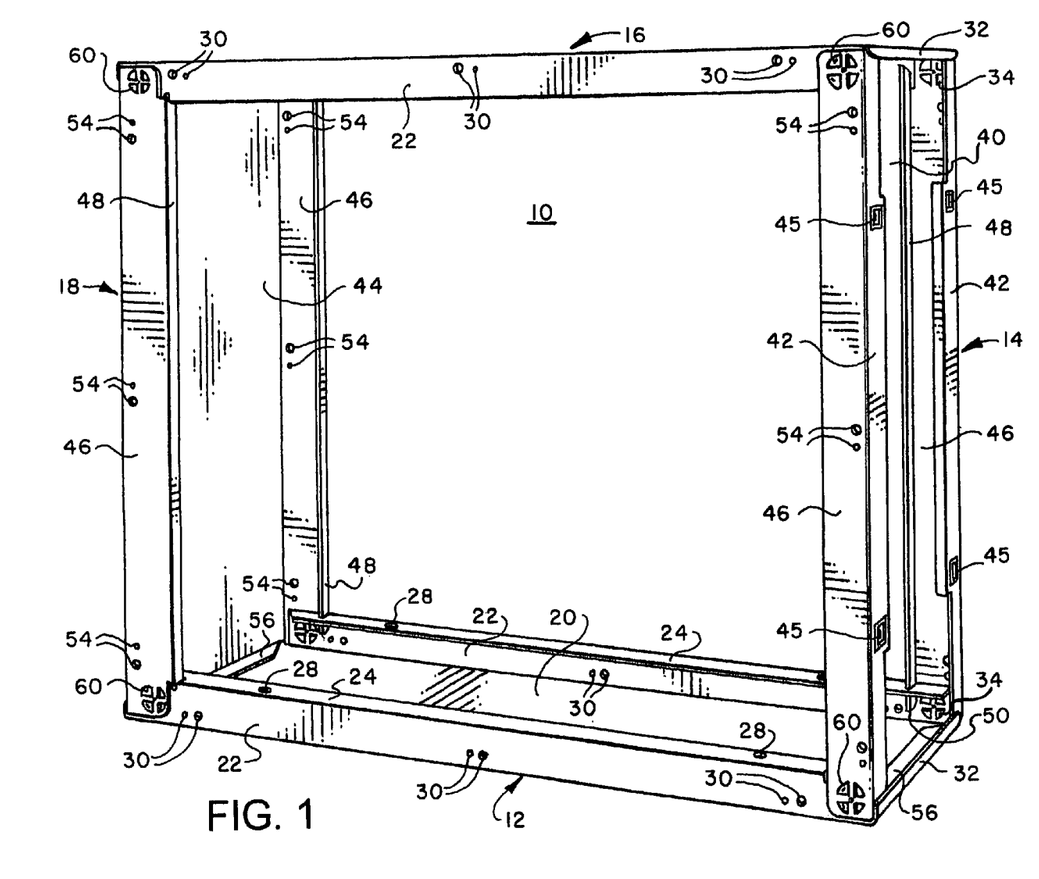
FIG. 1 is a perspective view of a rectangular, three-dimensional frame according to a preferred embodiment of the present invention, the frame comprising first, second, third and fourth interconnected frame members.
Figure 2:
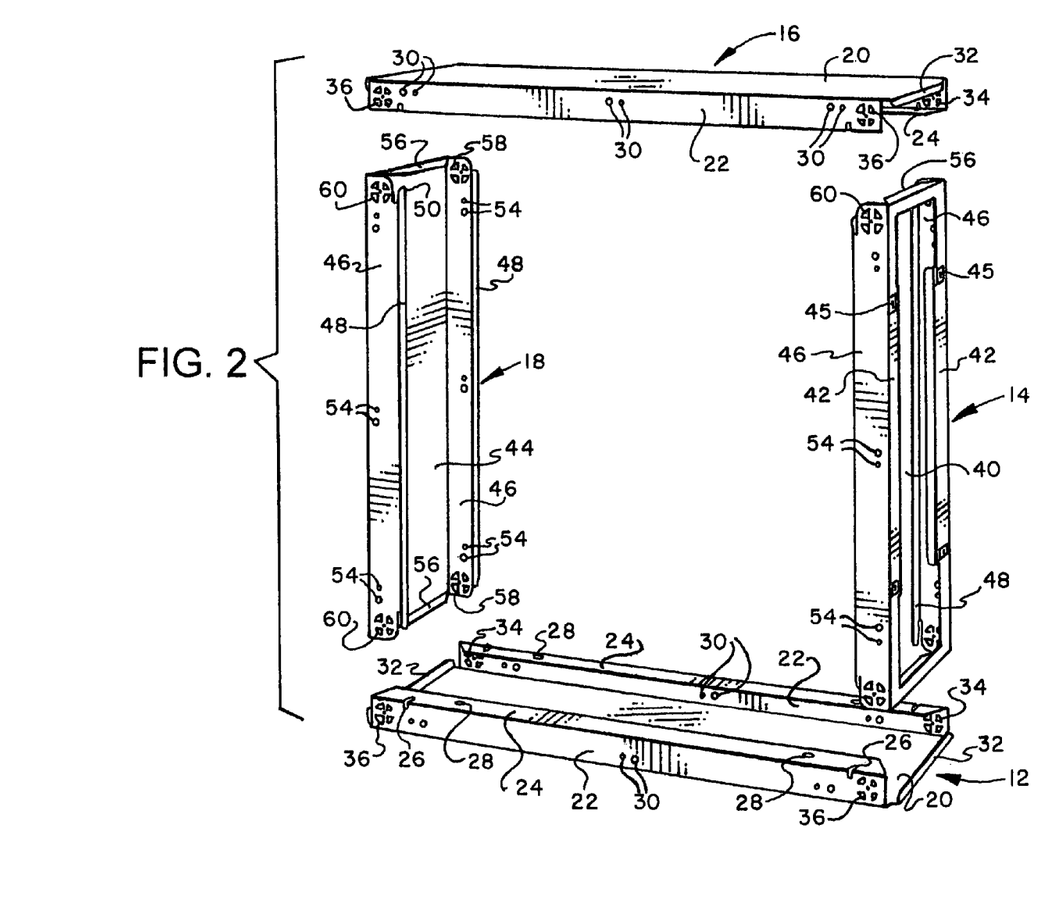
FIG. 2 is an exploded perspective view of the frame of FIG. 1.

Referring now to FIGS. 1 and 2, a rectangular, three-dimensional frame 10 adapted to house a selected component is comprised of first, second, third and fourth frame members 12, 14, 16, 18 that are interconnected at their respective ends to define frame 10. First and third frame members 12, 16 are in parallel relationship and second and fourth frame members 14, 18 are in parallel relationship. Frame 10 is open on both sides and one end thereof. In the orientation shown in FIG. 1, first and third frame members 12, 16 define the bottom and top, respectively, of frame 10 and second and fourth frame members 14, 18 define respective opposed ends of frame 10. Frame 10 is preferably made of a metal material, such as steel.

The configuration of first frame member 12 will now be described in detail, with reference to FIGS. 1-4. First and third frame members 12, 16 have identical configurations, such that the description of first frame member 12 hereinbelow applies equally to third frame member 16.

First frame member 12 is comprised of a relatively flat panel 20 and two opposed side walls 22 depending therefrom. Each wall 22 has an inwardly extending flange 24, which extends along substantially the entire major dimension of the corresponding wall 22. Each flange 24 is beveled at each end thereof. A slot 26 extends partially across each flange 24 and partially into the corresponding wall 22, adjacent each beveled end of the corresponding flange 24. Each flange 24 also has plural holes 28 therein, located between slots 26 on the corresponding flange 24. Each wall 22 has plural holes 30 therein, arranged in pairs. One of the holes 30 of each pair is larger than the other hole 30 of the corresponding pair. First frame member 12 also has opposed end flanges 32, depending from panel 20 in the same direction as walls 22, but oriented generally perpendicularly with respect to walls 22.

End portions of each wall 22 are displaced inwardly (e.g., by punching) to define a set of four generally convex humps 34 on an inner surface thereof and a corresponding set of four generally concave recesses 36 on an outer surface thereof. Each set of humps 34 and the corresponding set of recesses 36 are in opposed relationship, with humps 34 facing inwardly and the corresponding recesses 36 facing outwardly. As can be best seen in FIG. 3, each hump 34 and each recess 36 generally define a one-quarter circle, such that each set of four humps 34 and each set of four recesses 36 are symmetrically arranged in a generally circular pattern on the corresponding wall 22, with a hole 37 in the center of the circular pattern.

Figures 3, 4:
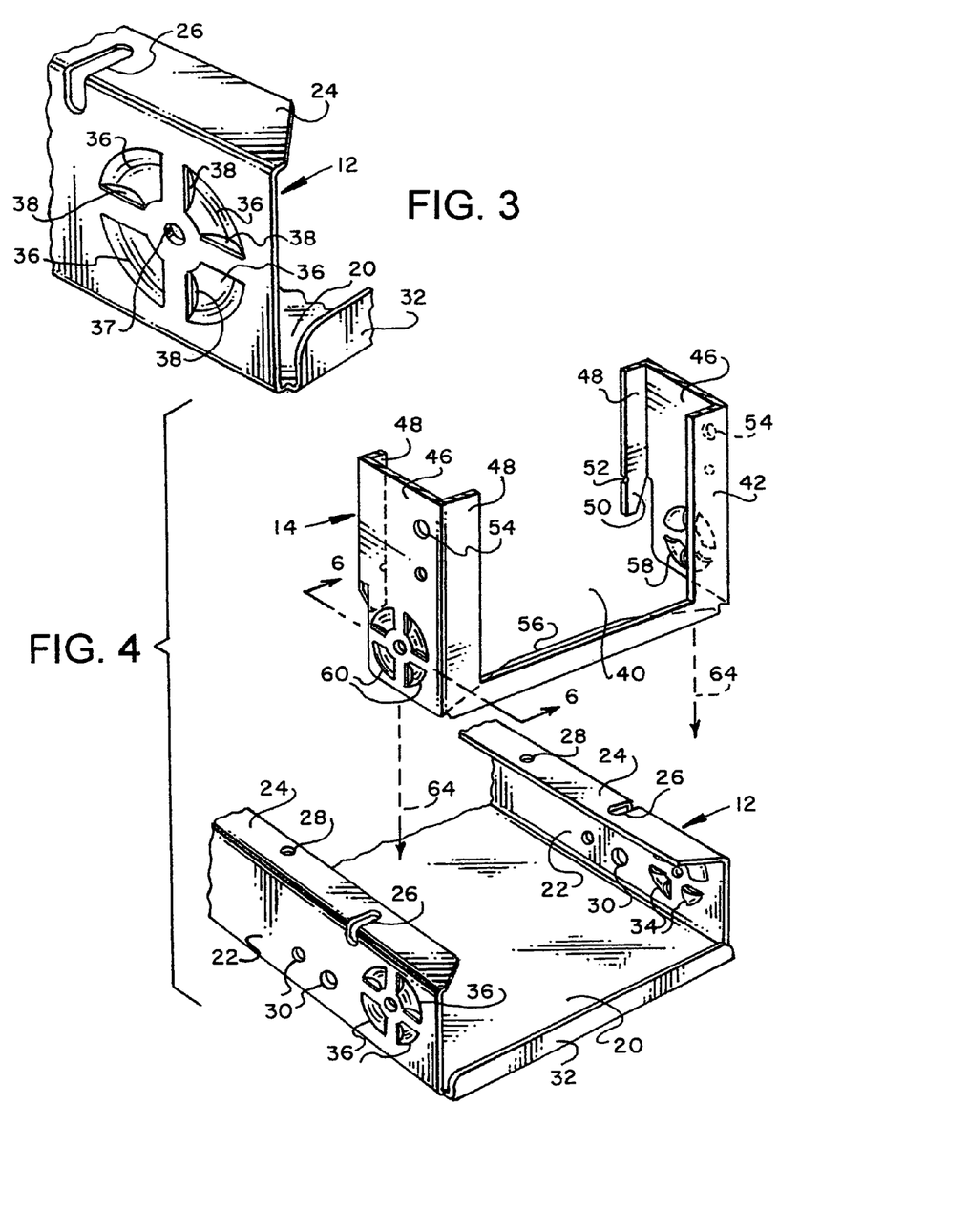
FIG. 3 is a detailed perspective view of a portion of the first frame member.
FIG. 4 is a detailed perspective view of respective portions of the first and second frame members.
Figure 5:
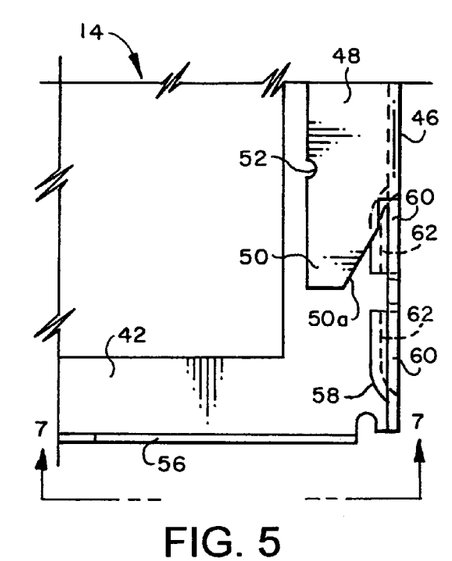
FIG. 5 is a rear elevation view of a portion of the second frame member, looking in the direction of arrows 5 in FIG. 6.
Figure 6:
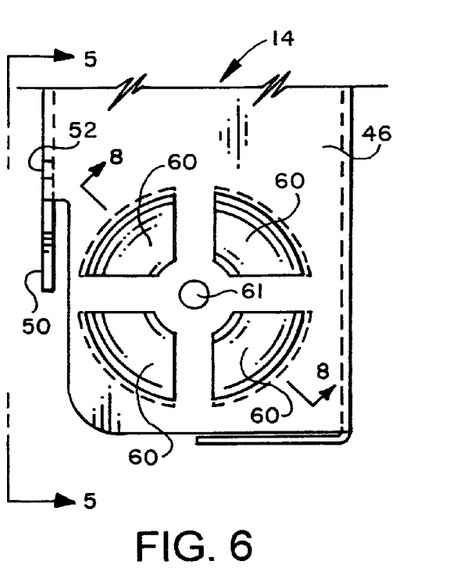
FIG. 6 is a side elevation view of a portion of the second frame member.
Figure 7:
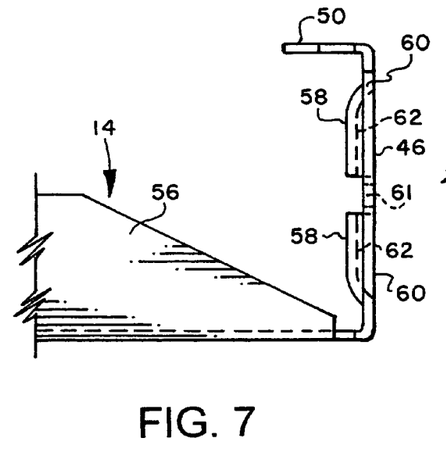
FIG. 7 is an end elevation view of a portion of the second frame member, looking in the direction of arrows 7 in FIG. 5.

Each recess 36 is contoured gradually inwardly from the corresponding wall 22, as can be best seen in FIG. 3, to facilitate assembly of frame 10, as will be described in greater detail hereinafter. As can be best seen in FIG. 3, each hump 34 is separated along two edges thereof from the corresponding wall 22 to define two generally opposed apertures 38 between each hump 34 and the corresponding wall 22.

The configuration of second frame member 14 will now be described in detail, with reference to FIGS. 1, 2 and 4-8. Second and fourth frame members 14, 18 have similar, but not identical configurations. Second frame member 14 has a central opening 40 surrounded by a rectangular base 42, whereas fourth frame member 18 has a relatively flat panel 44 in lieu of opening 40 and base 42. Further, base 42 has four plastic female snap connectors 45, adapted to engage complementary plastic male snap connectors on a door that is used to cover opening 40 after the external component has been inserted into frame 10, as will be described in greater detail hereinafter. Fourth frame member 18 does not have snap connectors 45. Except as indicated hereinabove, the description of second frame member 14 hereinbelow applies equally to fourth frame member 18.

Second frame member 14 has two opposed side walls 46 depending therefrom. Opening 40 defines an open end of frame 10 and is adapted to allow an external component to be inserted into frame 10 through opening 40. Each wall 46 has an inwardly extending flange 48, a portion of which is cut away to define a tab 50 at each end of the corresponding flange 48. Each flange 48 extends along a major dimension of the corresponding wall 46, but terminates short of each end of the corresponding wall 46. A notch 52 is located in each flange 48, adjacent each tab 50. Each wall 46 also has plural holes 54 therein, arranged in pairs. One of the holes 54 of each pair is larger than the other hole 54 of the corresponding pair. Second frame member 14 also has opposed end flanges 56, which are oriented generally perpendicularly with respect to walls 46. Each tab 50 has an outwardly facing beveled edge 50a, as can be best seen in FIGS. 4 and 5.

Located proximate to each end of each wall 46 are generally convex humps 58 on one side thereof and a corresponding set of four generally concave recesses 60 on an opposite side thereof. Humps 58 and recesses 60 are preferably formed in the same way as humps 34 and recesses 36 (i.e, by inwardly displacing portions of walls 46) and have substantially the same configuration as humps 34 and recesses 36, as described hereinabove. Each set of humps 58 and each set of recesses 60 are symmetrically arranged in a generally circular pattern on the corresponding wall 46, with a hole 61 in the center of the circular pattern.

Figure 8:
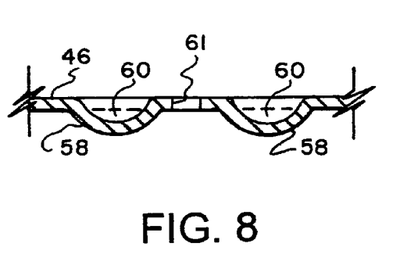
FIG. 8 is a section view, taken along the line 8-8 in FIG. 6.

Each recess 60 is contoured gradually inwardly from the corresponding wall 46, as can be best seen in FIG. 8, to facilitate assembly of frame 10, as will be described in greater detail hereinafter. As can be best seen in FIGS. 4, 5 and 7, each hump 58 is separated along two edges thereof from the corresponding wall 46 to define two generally opposed apertures 62 between each hump 58 and the corresponding wall 46.

One skilled in the art will recognize that, depending on the desired frame configuration, each set of humps 34, 58 and each set of recesses 36, 60 may be arranged in a pattern other than a circular pattern (e.g., in a square pattern) and/or the number of humps 34, 58 and the number of recesses 36, 60 in each set may be a number other than four. Further, humps 34, 58 and recesses 36, 60 are not necessarily in the shape of a one-quarter circle. For example, humps 34, 58 and recesses 36, 60 may be have a rectangular or trapezoidal shape.

The procedure for assembling frame 10 will now be described with reference to FIGS. 1, 2, 4 and 9-13. One of first and third frame members 12, 16 (for example, first frame member 12, as shown in FIG. 4) is placed on a relatively flat surface with panel 20 resting on the flat surface and walls 22 extending upwardly. One of second and fourth frame members 14, 18 (for example, second frame member 14, as shown in FIG. 4), is moved vertically downward, as indicated by arrows 64 in FIG. 4 and is snapped onto frame member 12 at one end thereof, such that an inner surface of each wall 46 is in contact with an outer surface of a corresponding wall 22, base 42 is inside of a corresponding end flange 32 and in contact therewith, a corresponding end flange 56 is in contact with panel 20, and tabs 50 penetrate through respective slots 26 to approximately the depth of the respective notches 52.

Figures 11, 12:
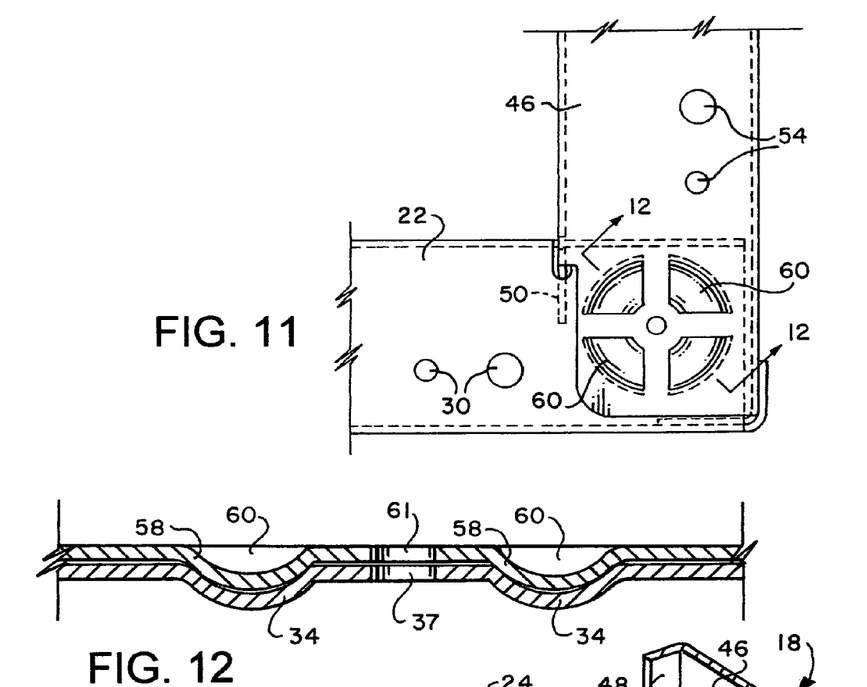
FIG. 11 is a side elevation view, showing the interconnection of the first and second frame members.
FIG. 12 is a section view, taken along the line 12-12 in FIG. 11.
Figure 13:
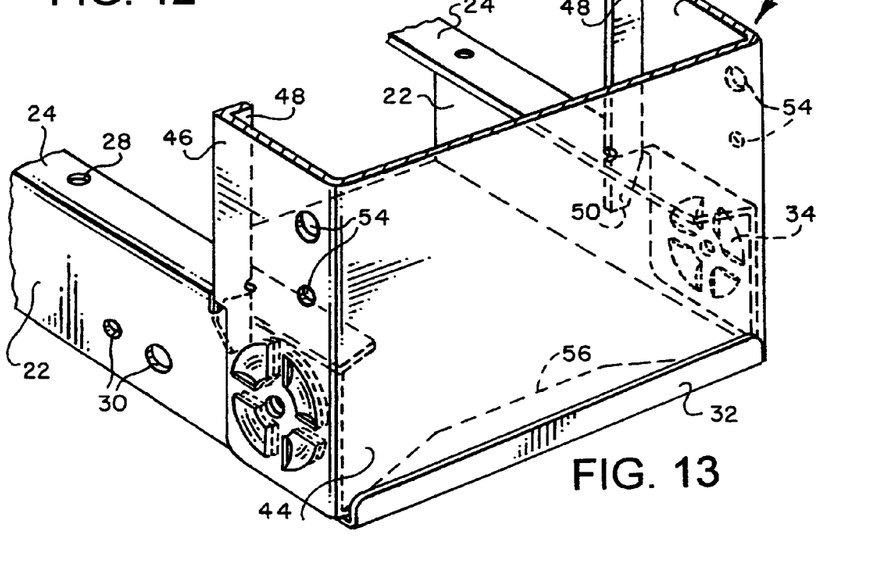
FIG. 13 is a partial perspective view, showing the interconnection of the first and fourth frame members.

The material tolerances are such that when second frame member 14 is snapped onto first frame member 12, humps 58 of second frame member 14 are urged into nesting engagement, as can be best seen in FIGS. 12 and 13, with respective recesses 36 of first frame member 12, to retain second frame member 14 in an upright position. The gradual contours of recesses 36 facilitate the sliding movement of humps 58 along the outer surface of the corresponding wall 22 into nesting engagement with recesses 36. Further, as shown in FIG. 13, holes 37, 61 are aligned when humps 58 are in nesting engagement with respective recesses 36, so that a fastener (not shown) may be passed through aligned holes 37, 61 to further secure frame members 12, 14 together.

Figures 9, 10:
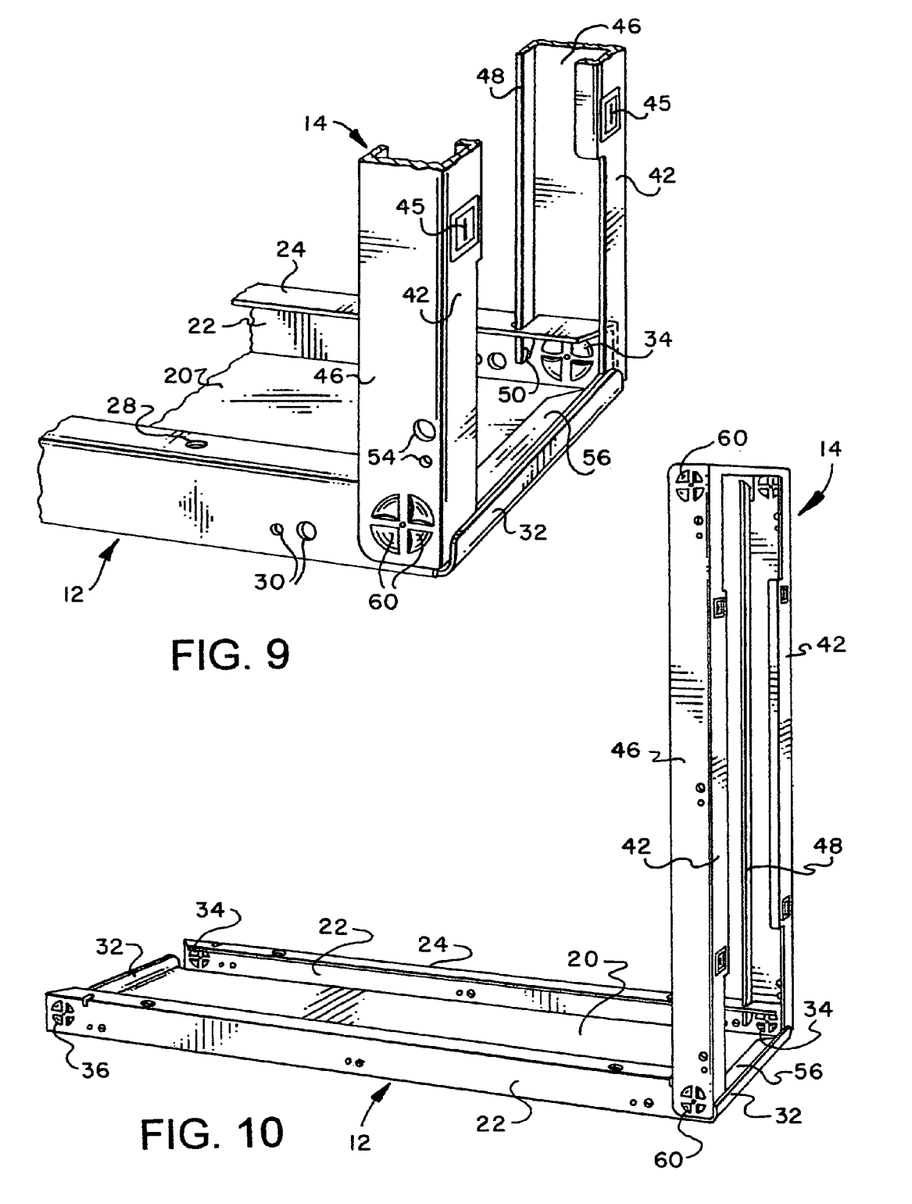
FIG. 9 is a partial perspective view, showing the interconnection of the first and second frame members.
FIG. 10 is a full perspective view, showing the interconnection of the first and second frame members.

Beveled edges 50a of tabs 50 facilitate the engagement of the corresponding tab 50 with the inner surface of the corresponding wall 22 to counteract any outward pulling force tending to disengage humps 58 from respective recesses 36. Further, flanges 48 are adapted to engage respective flanges 24, to counteract any force tending to rotate second frame member 14 with respect to first frame member 12. When first and second frame members 12, 14 are snapped together, as described hereinabove and as shown in FIGS. 9 and 10, a self-locking corner joint is defined at two corners of frame 10.

The second step in the assembly procedure is to snap the other one of second and fourth frame members 14, 18 (for example, fourth frame member 18) onto frame member 12 at an opposite end thereof from second frame member 14. Fourth frame member 18 is snapped onto first frame member 12 in the same manner as described above with reference to second frame member 14 (i.e., the inner surface of each wall 46 of fourth frame member 18 is in contact with the outer surface of a corresponding wall 22, panel 44 is inside of a corresponding end flange 32 and in contact therewith, the corresponding flange 56 of frame member 18 is in contact with panel 20, and tabs 50 of frame member 18 penetrate through respective slots 26 to the approximate depth of respective notches 52).

The material tolerances are such that when fourth frame member 18 is snapped onto first frame member 12, humps 58 of fourth frame member 18 are urged into nesting engagement with respective recesses 36 of first frame member 12, to retain fourth frame member 18 in an upright position and in parallel relationship to second frame member 14. The gradual contours of recesses 36 facilitate the sliding movement of humps 58 along the outer surface of the corresponding wall 22 into nesting engagement with recesses 36.

Beveled edges 50a of the respective tabs 50 facilitate the engagement of tab 50 with the inner surface of the corresponding wall 22 to counteract any outward pulling force tending to disengage humps 58 of fourth frame member 18 from respective recesses 36. Further, flanges 48 of fourth frame member 18 are adapted to engage respective flanges 24, to counteract any force tending to rotate fourth frame member 18 with respect to first frame member 12. When first and fourth frame members 12, 18 are snapped together, as described hereinabove and as shown in FIG. 11, a self-locking corner joint is defined at two other corners of frame 10.

The third step in the assembly process is to snap third frame member 16 simultaneously together with both second and fourth frame members 14, 18 at the opposite ends thereof from first frame member 12, so that the respective inner surfaces of walls 46 of frame members 14, 18 are in contact with the outer surfaces of the respective walls 22 of frame member 16, base 42 of frame member 14 and panel 44 of frame member 18 are inside of respective end flanges 32 of frame member 16 and in contact therewith, the corresponding end flanges 56 of frame members 14, 18 are in contact with panel 20 of frame member 16, and the corresponding tabs 50 of frame members 14, 18 penetrate through respective slots 26 of frame member 16 to the approximate depths of respective notches 52 of frame members 14, 18.

The material tolerances are such that when third frame member 16 is snapped together with second and fourth frame members 14, 18, humps 58 of second and fourth frame members 14, 18 are urged into nesting engagement with respective recesses 36 of third frame member 16, in the same manner as described hereinabove with respect to the attachment of frame members 14, 18 to first frame member 12, whereby third frame member 16 is retained in parallel relationship to first frame member 12. The gradual contours of recesses 36 of third frame member 16 facilitate the sliding movement of humps 58 of second and fourth frame members 14, 18 along the outer surface of the corresponding walls 22 into nesting engagement with the respective recesses 36.

Beveled edges 50a of tabs 50 facilitate the engagement of respective tabs 50 with the inner surface of the corresponding wall 22 to counteract any outwardly pulling force tending to disengage humps 58 of second and fourth frame members 14, 18 from respective recesses 36 of third frame member 16. Further, flanges 48 are adapted to engage respective flanges 24, to counteract any force tending to rotate second and fourth frame members 14, 18 with respect to third frame member 16. When third frame member 16 is snapped together with second and fourth frame members 14, 18, as described hereinabove, a self-locking corner joint is defined at the other four corners of frame 10 to complete the frame assembly, as shown in FIG. 1.

One example of the use of frame 10 is to house a filter media 70 (FIG. 19) or the like in an HVAC system. Frame 10 is attached to and between a furnace cabinet 72 and a return air duct 74 of the HVAC system, using conventional fasteners (not shown), which are passed through selected ones of holes 30 in respective walls 22 of frame members 12, 16 and corresponding aligned holes (not shown) in cabinet 72 and duct 74, as shown in FIG. 14.

Figures 14, 15A:
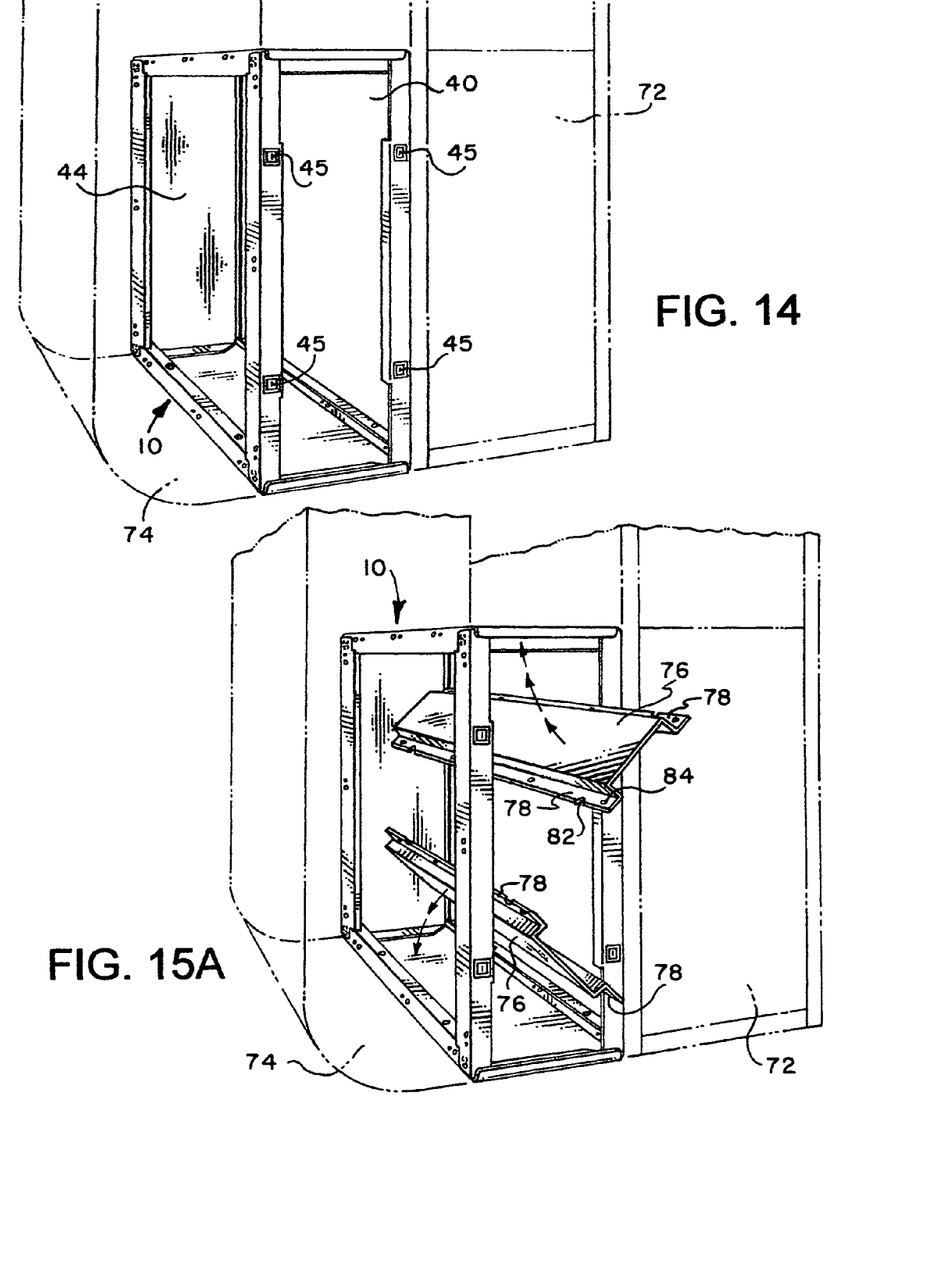
FIG. 14 is a perspective view of the frame of FIG. 1, installed in a central air conditioning system.
FIG. 15A is a perspective views of the installed frame depicted in FIG. 14, showing the installation of a rail member at the top and bottom of the frame.
Figures 15B, 15C:
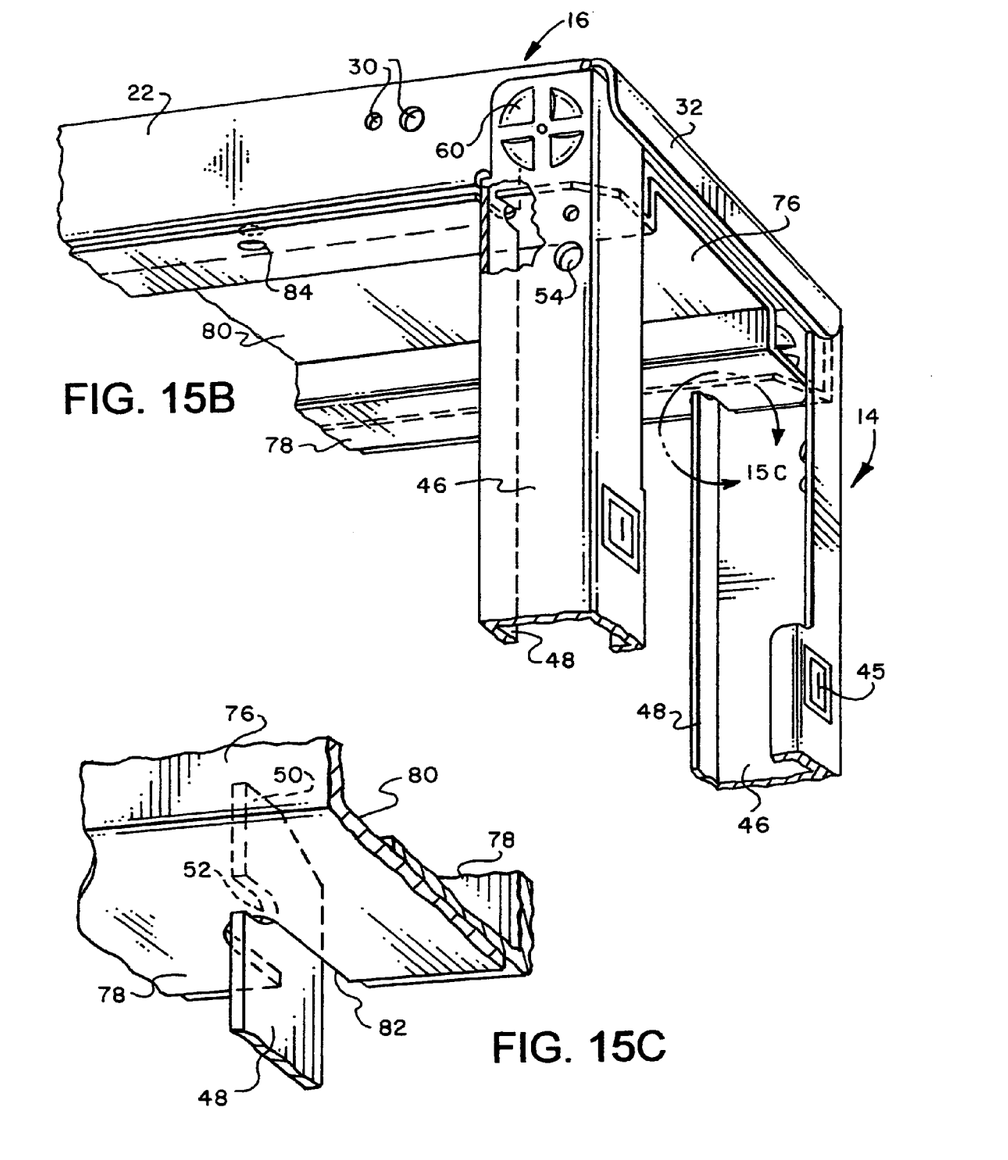
FIGS. 15B and 15C are detailed perspective views, showing how each rail member is retained in the frame.

Two rails 76 are then installed in frame 10, as shown in FIGS. 15A, 15B and 15C. Each rail 76 has opposed side flanges 78 and a channel 80 between flanges 78. Each flange 78 has a notch 82, proximate to each end thereof, and holes 84 spaced along the corresponding flange 78 between notches 82. A first rail 76 is installed in frame 10 by positioning its flanges 78 in facing contact with respective flanges 24 of first frame member 12, with notches 82 received in respective notches 52 of frame members 14, 18 and holes 84 aligned with respective holes 28 in flanges 24 of frame member 12. Flanges 48 of second and fourth frame members 14, 18 support flanges 78 in contact with respective flanges 24. First rail 76 may be further secured to first frame member 12 by means of screws or the like (not shown) that are passed through aligned pairs of holes 84, 28.

Figure 19:
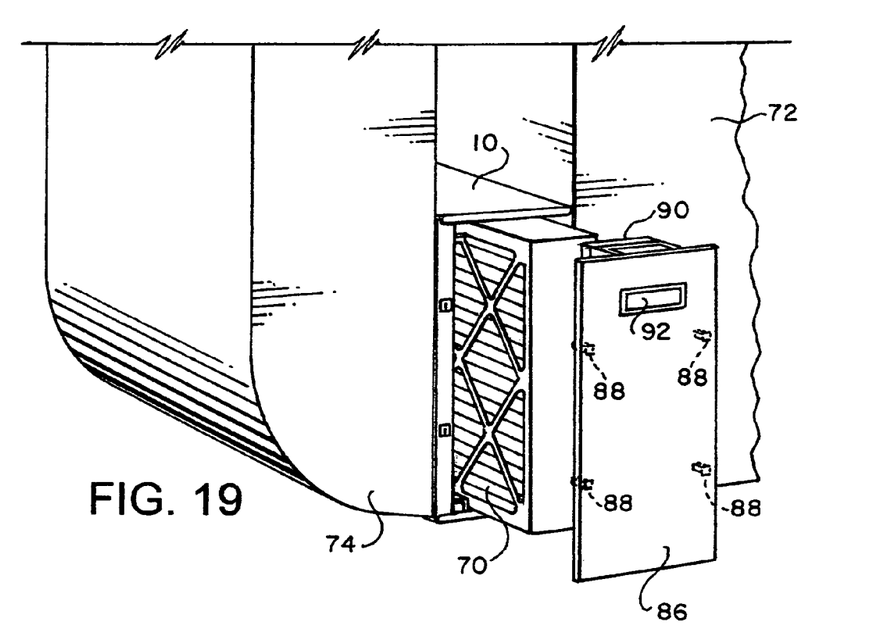
FIG. 19 is a perspective view of a portion of a central air conditioning system, with the frame of FIG. 1 installed therein and showing an air filter being inserted into the frame.
Figure 20:
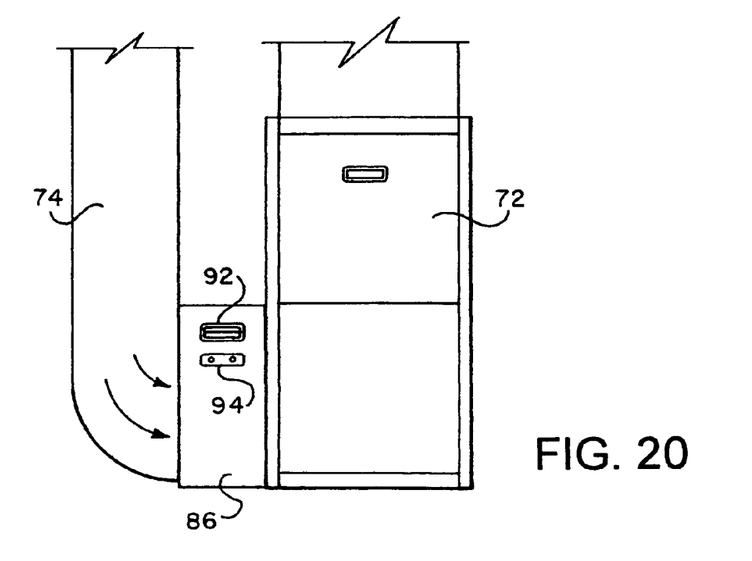
FIG. 20 is a front elevation view of the portion of the central air conditioning system shown in FIG. 19, with the frame installed therein and the door member of FIGS. 16-18 positioned to close off the frame after the air filter of FIG. 19 has been inserted into the frame.

The second rail 76 is installed in frame 10 by positioning its flanges 78 in facing contact with respective flanges 24 of frame member 16, with notches 82 received in respective notches 52 of frame members 14, 18 and holes 84 aligned with respective holes 28 in flanges 24 of frame member 16. Flanges 48 of second and fourth frame members 14, 18 support flanges 78 in contact with respective flanges 24. Second rail 76 may be further secured to third frame member 16 by means of screws or the like (not shown) that are passed through aligned pairs of holes 84, 28. Filter media 70 is then inserted into frame 10 by sliding media 70 along channels 80 of rails 76 and a door 86 is used to close off access to frame 10, as shown in FIGS. 19 and 20.

Figures 16, 17, 18:
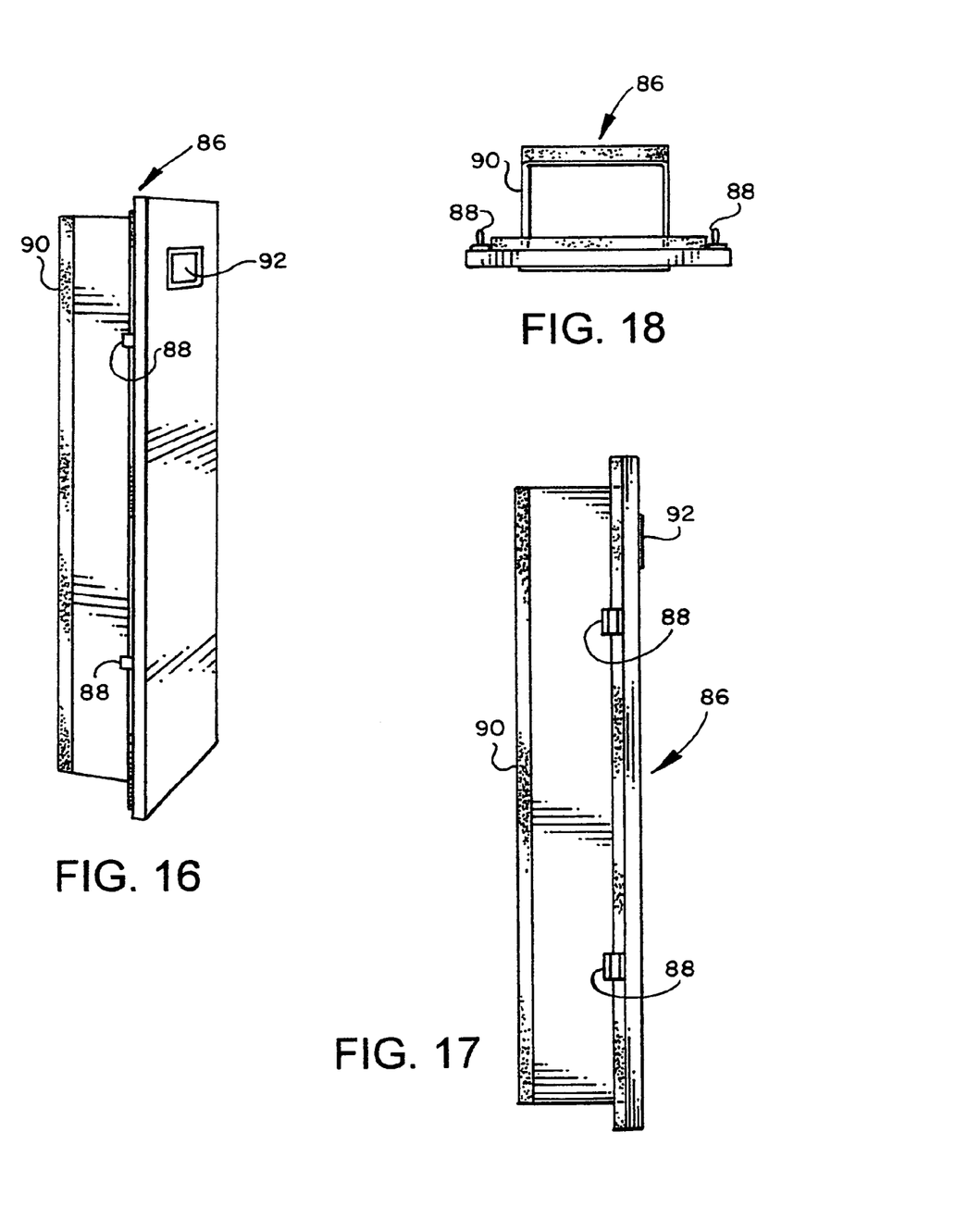
FIG. 16 is a perspective view of a door member adapted to close off access to the frame.
FIG. 17 is a side elevation view of the door member of FIG. 16.
FIG. 18 is an end elevation view of the door member of FIG. 16.

As shown in FIGS. 16-18, door 86 has plural male plastic snap connectors 88 and a housing 90 that projects into frame 10 when door 86 is positioned to close off access to frame 10. Housing 90 may be used to house electronic components or the like. A handle 92 is provided on the outside of door 90 to facilitate manual operation of door 90. Snap connectors 88 are adapted to engage the female snap connectors 45 on base 42 of frame member 12, as can be best seen in FIG. 19, so that door 90 is removably attached to frame member 14. Door 86 may also include a visual display 94 (FIG. 20), such as one or more indicator lights, to provide an visual indication of the status of air filter 70. Air flow in the HVAC system is indicated by the arrows in FIG. 20. The return air is filtered by filter 70 before entering furnace cabinet 72.

The best mode for carrying out the invention has now been described in detail. Since changes in and modifications to the above-described best mode may be made without departing from the nature, spirit and scope of the invention, the invention is not to be limited to the above-described best mode, but only by the appended claims and their equivalents. For example, the invention also has application in two dimensional frames, such as picture frames, and in frame configurations other than rectangular-shaped frames.

The invention claimed is:

1. A frame, comprising:
   first and second frame members;
   a portion of said first frame member being displaced inwardly to define a first projection on an inner surface of said first frame member and a first recess in an outer surface of said first frame member in opposed relationship to said first projection;
   a portion of said second frame member being displaced inwardly to define a second projection on an inner surface of said second frame member and a second recess in an outer surface of said second frame member in opposed relationship to said second projection;
   said second projection being in nesting engagement with said first recess with said second recess facing outwardly and said first projection facing inwardly, whereby said first and second frame members are connected to define at least a portion of said frame;
   wherein said first frame member has a first wall and a first inwardly extending flange depending therefrom;
   wherein said second frame member has a second wall and a second inwardly extending flange depending therefrom; and
   wherein said first flange has a slot proximate to each end of said first flange and said second flange has a tab defining an end portion of said flange, said tab having a beveled edge in facing relationship with said first wall, said beveled edge being adapted to facilitate engagement of said tab with said first wall.

2. The frame of claim 1 wherein said first projection is located on one side of said first wall and said first recess is located on an opposite side of said first wall, said second projection being located on one side of said second wall and said second recess being located on an opposite side of said second wall.

3. The frame of claim 1 wherein said first projection defines a first hump on an inner surface of said first frame member, a portion of said first hump being separated from said inner surface of said first frame member to define a first aperture therebetween, said second projection defining a second hump on an inner surface of said second frame member, a portion of said second hump being separated from said inner surface of said second frame member to define a second aperture therebetween.

4. The frame of claim 1 wherein said first projection defines a first hump on an inner surface of said first frame member, plural discrete portions of said first hump being separated from said inner surface of said first frame member to define respective first apertures between said first hump and said inner surface of said first frame member, said second projection defining a second hump on an inner surface of said second frame member, plural discrete portions of aid second hump being separated from said inner surface of said second frame member to define respective second apertures between said second hump and said inner surface of said second frame member.

5. A frame comprising:
   a first frame member having a first base portion, a pair of opposed first side walls depending from said first base portion, a pair of first flanges depending inwardly from the respective first side walls, a portion of each first side wall being displaced inwardly to define respective first projections and respective first recesses in opposed relationship to the respective first projections;
   a second frame member having a second base portion, a pair of opposed second side walls depending from said second base portion, a pair of second flanges depending inwardly from the respective second side walls, a portion of each second side wall being displaced inwardly to define respective second projections and respective second recesses in opposed relationship to the respective second projections;
   said first frame member being positioned with respect to said second frame member such that said first and second base portions are in generally orthogonal relationship, an outer surface of each of said first side walls is in contact with an inner surface of one of said second side walls and each of said first recesses is in nesting engagement with one of said second projections, such that said second recesses are facing outwardly on said frame and
   wherein said first frame member has a slot in each of said first flanges proximate to each end of said first flanges and said second frame member has a tab defining an end portion of each of said second flanges, each of said tabs penetrating through one of said slots such that the second flanges are in a plane generally orthogonal to a plane of said first flanges.

6. The frame of claim 5 wherein said first projections and said first recesses are proximate to respective ends of the respective first side walls and said second projections and said second recesses are proximate to respective ends of the respective second side walls, said frame further including third and fourth frame members, said first and third frame members being in parallel relationship and being connected to said second and fourth frame members, said second and fourth frame members being in parallel relationship and being connected to said first and third frame members to define a generally rectangular frame, portions of said third frame member proximate to respective ends thereof being displaced inwardly to define respective third projections and respective third recesses in opposed relationship to said third projections, portions of said fourth frame member proximate to respective ends thereof being displaced inwardly to define respective fourth projections and respective fourth recesses in opposed relationship to said fourth projections, each of said second projections and each of said fourth projections being in nesting engagement with one of said first and third recesses, whereby said first and third frame members are connected to said second and fourth frame members to define respective corner joints of said frame.

7. The frame of claim 6 further including at least one rail member adapted to receive an element inserted into said frame by slideable movement along said at least one rail member.

8. The frame of claim 7 wherein said at least one rail member includes a notch adapted to engage a complementary portion of one of said first, second, third and fourth frame members, to mount said rail member in a predetermined position with respect to said frame.

9. The frame of claim 7 wherein said second base portion has a central opening to accommodate insertion of an object into said frame, said frame further including a cover member adapted to close off said central opening.

10. The frame of claim 5 further including a notch in each of said second flanges proximate to a corresponding tab, said notch being adapted to engage one of said first flanges to retain the corresponding tab in penetrating relationship with a corresponding slot.

11. The frame of claim 10 wherein each of said tabs has a beveled edge in facing relationship with a corresponding one of said first side walls to facilitate engagement of the corresponding tab with the corresponding first side wall.

12. The frame of claim 11 wherein each of said slots extends at least partially into a corresponding one of the first side walls.

13. The frame of claim 5 wherein said first and second base portions are generally rectangular, said first side walls are in generally orthogonal relationship with said second side walls, said first side walls being coupled to the respective said second side walls by the nesting engagement of said first recesses with the respective second projections.

14. The frame of claim 13 wherein said first frame member further includes a first end wall depending from said first base portion and extending between said first side walls, said second frame member further including a second end wall depending from said second base portion and extending between said second side walls, said second base portion being in contact with an inner surface of said first end wall, said second end wall being in contact with said first base portion.

15. The frame of claim 5 wherein said first projections and said first recesses are proximate to respective ends of the respective first side walls and said second projections and said second recesses are proximate to respective ends of the respective second side walls.

* * * * *